(12) United States Patent
Robb et al.

(10) Patent No.: US 8,440,919 B2
(45) Date of Patent: May 14, 2013

(54) CABLE GLAND SEAL (75) Inventors: James Robb, Haslemere (GB); Geoffrey Mood, Whitley Bay (GB)

(73) Assignee: CMP Products Limited, Northumberland (GB)

( * ) Notice: Subject to any disclaimer, the term of this patent is extended or adjusted under 35 U.S.C. 154(b) by 68 days.

(21) Appl. No.: 12/995,051

(22) PCT Filed: May 29, 2009

(86) PCT No.: PCT/GB2009/050587
§ 371 (c)(1), (2), (4) Date: Feb. 10, 2011

(87) PCT Pub. No.: WO2009/144505
PCT Pub. Date: Dec. 3, 2009

(65) Prior Publication Data
US 2011/0120766 A1 May 26, 2011

(30) Foreign Application Priority Data

May 31, 2008 (GB) .................................. 0809953.3
Dec. 15, 2008 (GB) .................................. 0822803.3

(51) Int. Cl.
*H02G 3/18* (2006.01)
*H02G 15/013* (2006.01)

(52) U.S. Cl.
USPC ............ 174/652; 174/650; 174/654; 277/616

(58) Field of Classification Search .................. 174/652, 174/650, 653, 654, 655, 660, 539, 554, 564, 174/667, 651; 277/616, 615; 16/2.1, 2.2; 439/578
See application file for complete search history.

(56) References Cited

U.S. PATENT DOCUMENTS

| 4,515,991 | A  | * | 5/1985 | Hutchison ..................... | 174/655 |
| 4,525,000 | A  |   | 6/1985 | Bachle |  |
| 5,691,505 | A  | * | 11/1997 | Norris ........................... | 174/655 |
| 6,809,263 | B2 | * | 10/2004 | Jackson ......................... | 174/651 |
| 6,812,406 | B2 | * | 11/2004 | Hand ............................. | 174/667 |
| 7,563,993 | B2 | * | 7/2009 | Drotleff et al. ............... | 174/655 |
| 7,749,021 | B2 | * | 7/2010 | Brodeur ......................... | 439/578 |
| 7,781,685 | B2 | * | 8/2010 | Bartholoma et al. .......... | 174/654 |

FOREIGN PATENT DOCUMENTS

| DE | 199 21 311 | 11/2000 |
| FR | 2 440 484 | 5/1980 |
| FR | 2 768 270 | 3/1999 |

OTHER PUBLICATIONS

The International Search Report and Written Opinion as mailed on Aug. 11, 2009 for International Application No. PCT/US2009/050587.

* cited by examiner

*Primary Examiner* — Angel R Estrada
(74) *Attorney, Agent, or Firm* — Quarles & Brady LLP (57) ABSTRACT

A seal (300) for use in a cable gland (301) is disclosed. The seal (300) has a body portion (308) formed from a first rubber material having a first hardness and seals against a cable (320). The seal (300) also has one or more support portions (302,304) formed from a second material that is harder than the first material and supports the structure of the body (308) against excessive deformation as well as forming a mechanical grip with the cable (320).

4 Claims, 9 Drawing Sheets

CABLE GLAND SEAL

CROSS-REFERENCE TO RELATED APPLICATIONS

The present application claims the benefit of British Patent Application No. GB 0809953.3 filed May 31, 2008, the benefit of British Patent Application No. GB 0822803.3 filed Dec. 15, 2008, and the benefit of PCT International Application No. PCT/GB2009/050587 filed May 29, 2009, all of which are incorporated herein by reference for all purposes.

The present invention relates to a seal for a cable gland and relates particularly, but not exclusively, to a seal for a cable gland which prevents axial movement of the cable extending therethrough.

Figure 1:
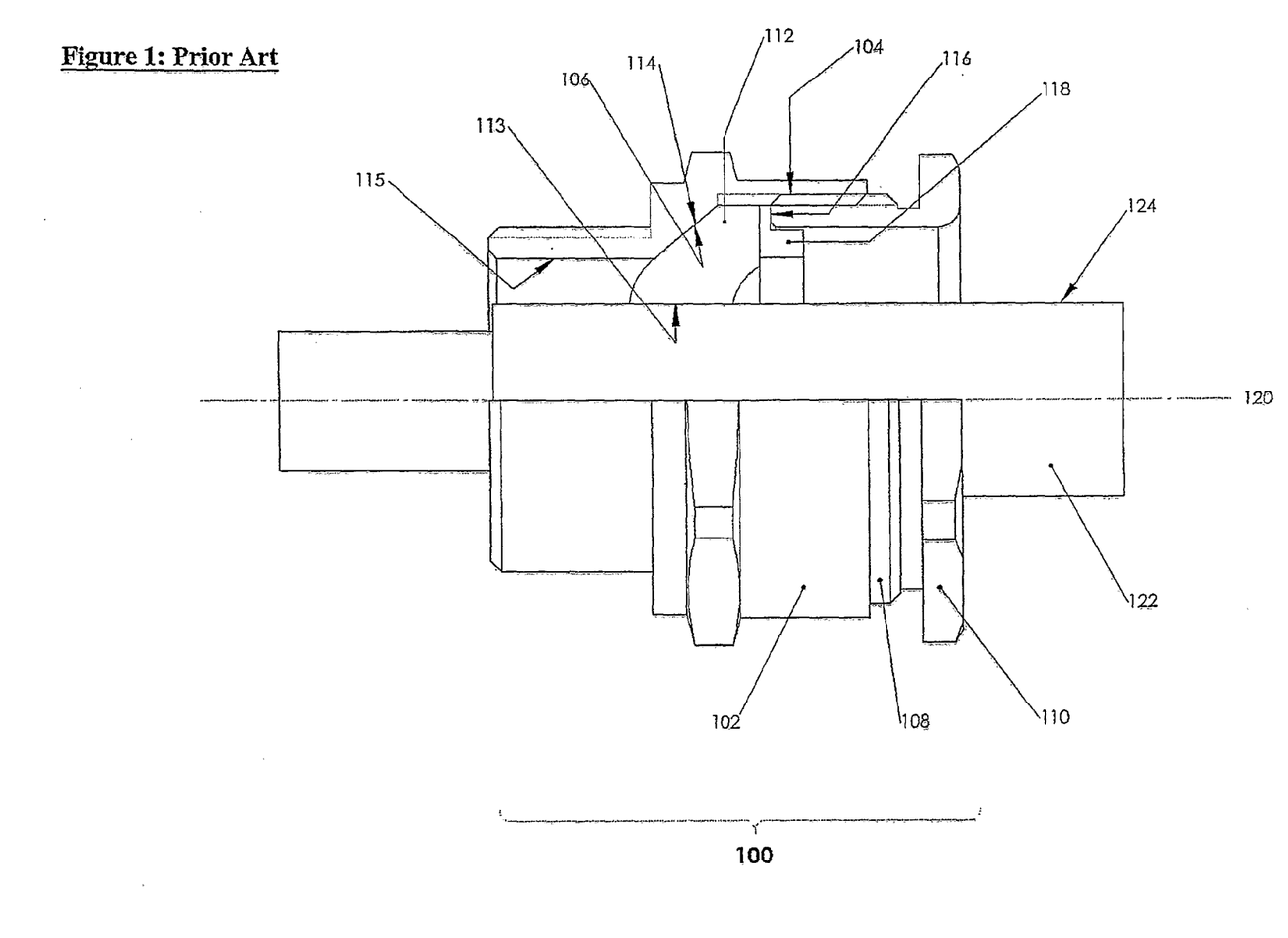
FIG. 1 is a cross sectional view of a cable gland comprising a seal of the prior art.
Figure 2:
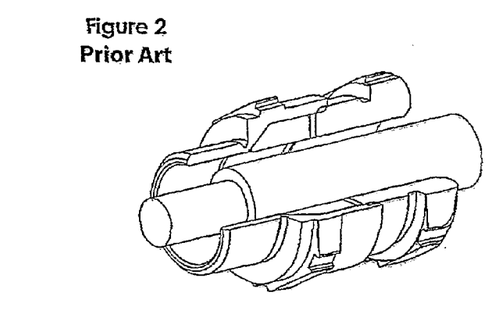
FIG. 2 is a sectional view of a second cable gland comprising a seal of the prior art.

A cable gland 100 currently in use, illustrated in FIG. 1, has a substantially cylindrical first sealing portion 102 having both first and second internal surface portions 104, 106. The first internal surface portion 104 is internally threaded and the second internal surface portion 106 is a cam surface. The second substantially cylindrical sealing portion 110 has an externally threaded surface 108 which is adapted to be threadably engaged with the internally threaded surface 104 of the first sealing portion 102.

The cable gland 100 in FIG. 1 further comprises a substantially ring shaped seal 112 consisting of an elastic material, which also has a cam surface 114. The seal 112 is brought into engagement with the first sealing portion 102 such that the cam surface 106 of the first sealing portion 102 engages the cam surface 114 of the seal 112. A surface 116 of the second sealing portion 110 engages a washer 118 which is also in engagement with the seal 112.

The cable gland 100 has an axis 120 extending along its cross sectional centre of rotation. A cable 122 is made to extend with clearance through the first sealing portion 102, the second sealing portion 110, the seal 112 and the washer 118 along axis 120 so that the first and second sealing portions 102, 110 are threadably engaged with each other around the washer 118 and seal 112.

A cable 122 which extends through the cable gland 100 with clearance has an outer surface 124 which is closer to axis 120 than the inner surface of the first sealing portion 102, the second sealing portion 110, the washer 118 or the seal 112. When the extent to which the first and second sealing portions 102, 110 are threadably engaged is increased, the more the seal 112, which is between the two sealing portions, is brought into contact with the cam surface 106 and washer 118 which is acted on by surface 116 of the second sealing portion 110.

The reaction forces exerted on the seal 112 by both the cam surface 106 and washer 118 cause the seal 112 to deform in such a way that its inner most surface 113 is brought into engagement with the outer most surface 124 of the cable 122 such that the seal 112 presses down and exerts a component of force on the cable 122 along a direction perpendicular to axis 120. The reaction force exerted by the seal 112 on the cable 122 perpendicular to axis 120 acts to produce a frictional force between the cable 122 and seal 112 in order to prevent any lateral movement of the cable 122 along axis 120 if a component of force is applied to the cable 122 along axis 120. This prevents any electrical connections of the cable 122 being disconnected. This also acts to provide a water tight seal between the seal 112 and the cable 122 allowing the cable gland to shield electrical components in a first volume from the environment in a second volume.

A gland and seal combination is designed to work with a range of cable diameters. When a cable having a diameter at the upper end of the compatible range of cable diameters for any particular gland/seal combination is used a significant gripping force may be applied to the cable without it slipping therefore allowing the gland/seal/cable combination to pass a quite stringent pull test.

However, the smaller the diameter of the cable that is used, the more unlikely the gland/seal/cable combination is to pass a stringent pull test. It has also been observed to be the case that if the gland is over tightened in an attempt to increase the grip of the seal on a cable, this has the opposite effect in that the grip decreases the more that a gland is over tightened.

It is therefore desirable to produce a gland and seal combination that can work with a wide range of cable diameters whilst maintaining significant grip, sufficient enough to pass a stringent pull test, for all compatible diameters of cable.

Preferred embodiments of the present invention seek to overcome the above disadvantages of the prior art.

According to the present invention there is provided a seal for use in a cable gland, the seal comprising:—
- a body formed from a first material having a first hardness, the body adapted to at least partially engage a surface of an elongate object; and
- at least one support portion formed from a second material having a second hardness greater than the first hardness, in use the support portion being at least partially engaged with the body and being adapted to control deformation of the body resulting from forces applied to the seal by a cable gland.

By incorporating support portions into a seal, the ease with which such a seal can be extruded may be reduced. This is achieved because the support portions provide support to the material constituting the body of the seal thereby reducing the ease with which a seal may be deformed and the ease with which a seal can be extruded, that is forced along the inside of a gland against a cable, when acted upon by external forces. This provides the advantage of increasing the range of cable diameters with which a gland/seal/cable combination can pass a stringent pull test and so reduces costs for manufacturers and operators as a greater range of cables can be sealed and gripped with a smaller range of glands.

Also, by incorporating support portions into a seal, the extent to which the inner most surface of such a seal can buckle may be reduced such that the area of the seal engaged with the outermost surface of a cable remains substantially constant once the inside surface of the seal first becomes engaged with the cable as the extent to which the first and second sealing portions are threadably engaged is increased. Furthermore, the presence of the support portions within the seal decreases the extent to which the seal can be deformed by being pushed beyond the cam surface 106 in the prior art. In the example of the prior art shown in FIG. 1 it appears to be the case that as the extent to which first and second sealing portions 102, 110 are brought into engagement is increased the seal 112 is increasingly forced beneath the cam surface 106 of the first sealing portion 102 and into the space between the outer most surface 124 of the cable 122 and the inner most surface 115 of the first sealing portion 102. This extrusion process reduces the grip of the seal 112 on the cable 122. The smaller the diameter of the cable 122 used in conjunction with any particular gland/seal combination, the easier it is to force the seal 112 into the space between the outer most surface 124 of the cable 122 and the inner most surface 115 of the first sealing portion 102. Therefore the smaller the diameter of the cable that is used with any particular gland/seal combination the less likely the gland/seal/cable combination is to pass a stringent pull test.

The use of the support portion in the seal provides the advantage of a tighter grip on the cable and a better seal between the volumes on either side of the seal by reducing deformation of the seal when pressure is applied to it. This in turn reduces costs for manufacturers and operators as a greater range of cables can be sealed and gripped with a smaller range of glands.

By providing support portions on a seal which are able to engage the outermost surface of a cable allows the support portions to form a mechanical bond with the cable surface. This provides the advantage of increasing the grip provided by the seal on the cable which increases the likely hood of a gland/seal/cable combination to pass a stringent pull test.

In a preferred embodiment at least one support portion is substantially ring shaped.

In another preferred embodiment at least one support portion is a split ring, the split ring comprising at least one split portion.

In a further preferred embodiment the inner surface of the body comprises at least one annular recess.

This provides the advantage that the support portions may be incorporated into the seal both quickly and easily.

In a preferred embodiment at least one support portion is at least partially embedded within the body.

This provides the advantage of controlling the deformation of the body of the seal with the added advantage that the support portions will not be lost.

According to another aspect of the present invention there is provided a support portion for use in conjunction with a seal used in a cable gland, the support portion comprising a substantially tubular body having a solid portion and a missing portion, the solid portion having at least a partially annular external surface and an internal surface of a first cross sectional shape, wherein the external and the internal surfaces are adapted to respectively receive and transfer a force, the solid portion further comprises first and second edge portions defining the missing portion, and the first and second edge portions are adapted to move closer together when the external surface of the solid portion receives a force.

This provides the advantage of improving the gripping and sealing properties of seals currently used in cable glands when used in conjunction with such a seal.

In a preferred embodiment the internal surface of the solid portion is at least partially curved.

In another preferred embodiment the internal surface of the solid portion is at least partially flat.

In a further preferred embodiment the support portion further comprises at least one flange portion at least partially in engagement with the solid portion.

Preferred embodiments of the invention will now be described, by way of example only and not in any limitative sense, with reference to the accompanying drawings in which: —

Figure 3:
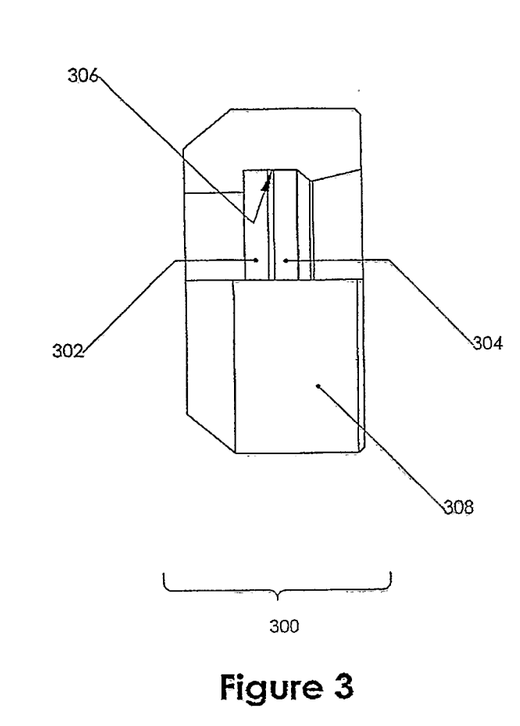
FIG. 3 is a partial cross sectional view of a seal for a cable gland according to the present invention.
Figure 4:
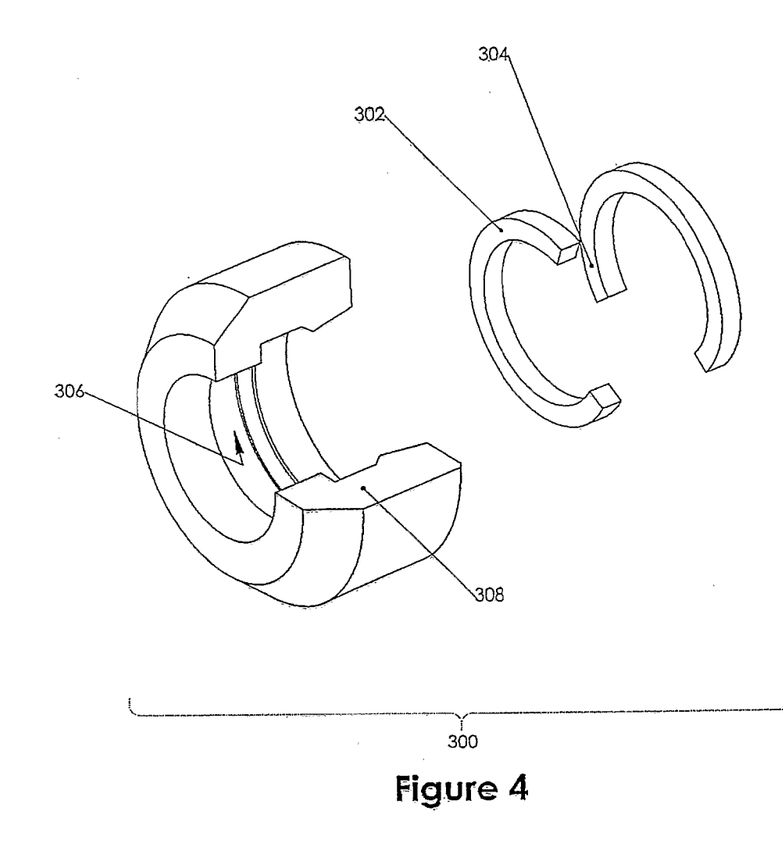
FIG. 4 is a perspective view of the seal in FIG. 3.

A cable gland seal according to the present invention, illustrated in FIG. 3, is substantially similar to the seal 112 illustrated in FIG. 1 as described in the introduction. However, with reference to FIGS. 3 and 4, the seal 300 according to the present invention has two support portions, hereinafter referred to as grip rings 302, 304, which engage the inside surface 306 of the substantially ring shaped body 308 of the seal 300. The seal may comprise a single grip ring however in a preferred embodiment two such grip rings are used as support portions. Such grip rings 302, 304 consist of a different material to that constituting the body 308. In particular the different materials have different mechanical properties in that the grip rings have a greater hardness than the body. The operation of the cable gland seal 300 shown in FIGS. 3 and 4 will now be described.

Figure 5:
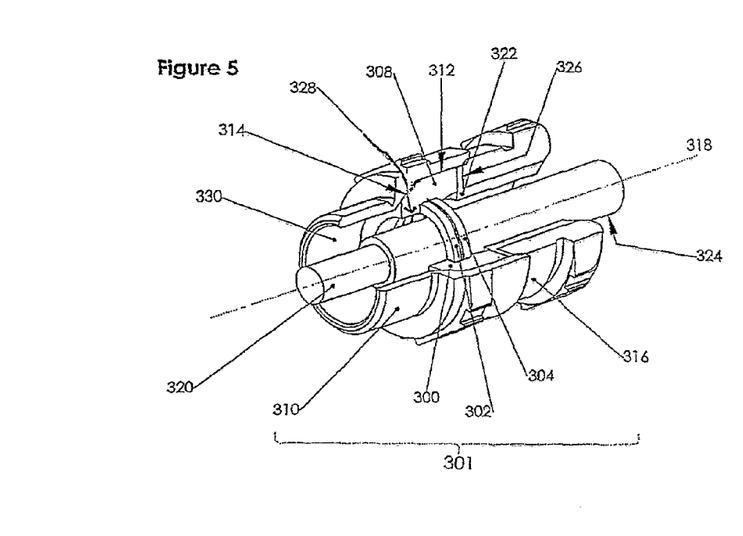
FIG. 5 is a sectional view of a cable gland having a seal according to the present invention.

FIG. 5 illustrates a cable gland having a seal according to the present invention. The cable gland illustrated in FIG. 5 is substantially similar to that illustrated in FIG. 1 however the cable gland illustrated in FIG. 5 uses a seal according to the present invention.

The cable gland 301 has a substantially cylindrical first sealing portion 310 having both first and second internal surface portions 312, 314 wherein the first internal surface portion 312 is internally threaded and the second internal surface portion 314 is a cam surface. The second substantially cylindrical sealing portion 316 has an externally threaded surface which is adapted to be threadably engaged with the internally threaded surface of the first sealing portion 310.

The cable gland in FIG. 5 has an axis 318 extending along its cross sectional centre of rotation. A cable 320 is made to extend with clearance through the first sealing portion 310, the second sealing portion 316, a seal 300 according to the present invention and a washer 322 along axis 318 with the first and second sealing portions 310, 316 threadably engaged with each other around the washer 322 and seal 300.

A cable 320 which extends through the cable gland 301 with clearance has an outer surface 324 which is closer to axis 318 than the inner surface of the first sealing portion 310, the second sealing portion 316, the washer 322 or seal 300. When the extent to which the first and second sealing portions 310, 316 are threadably engaged is increased, the more the seal 300, which is between the two sealing portions, is brought into contact with the cam surface 314 and washer 322 which is acted on by surface 326 of the second sealing portion 316.

The reaction forces exerted on the seal 300 by both the cam surface 314 and washer 322 cause the seal 300 to deform in such a way that the inner most surface 328 of the body 308 of the seal 300 and grip rings 302, 304 are brought into engagement with the outer most surface 324 of the cable 320 such that the seal 300 presses down and exerts a component of force on the cable 320 along a direction perpendicular to axis 318. The reaction force exerted by the seal 300 on the cable 320 perpendicular to axis 318 acts to provide friction between the cable 320 and seal 300 in order to prevent any lateral movement of the cable 320 along axis 318 if a component of force is applied to the cable 320 along axis 318.

As the body 308 of the seal 300 is increasingly deformed due to an increase in the extent to which the first and second sealing portions 310, 316 are threadably engaged, the more the body 308 of the seal 300 is forced beneath the cam surface 314 of the first sealing portion 310 and into the space between the outer most surface 324 of the cable 320 and the inner most surface 330 of the first sealing portion 310. This acts to provide a water tight seal between the seal 300 and the outer most surface 324 of the cable 320. This allows the cable gland 301 to shield components in a first volume from the environment in a second volume wherein the cable gland 301 is a means of communication between the two volumes.

As mentioned above, when the extent to which the first and second sealing portions 310, 316 are threadably engaged is increased, the body 308 of the seal 300 deforms. Ideally the inner most surface 328 of the body 308 of the seal 300 and the grip rings 302, 304 remain substantially flush with the outer most surface 324 of the cable 320. The grip rings 302, 304 act to reduce the extent to which the inside surface 328 of the body 308 of the seal 300 can buckle such that the area of the seal 300 engaged with the outermost surface 324 of the cable 320 remains substantially constant once the seal 300 initially becomes engaged with the cable 320 as the extent to which the first and second sealing portions 310, 316 are threadably engaged is increased.

The grip rings 302, 304 also act to reduce the extent to which the body 308 of the seal 300 is forced beneath the cam surface 314 of the first sealing portion 310 and into the space between the outer most surface 324 of the cable 320 and the inner most surface 330 of the first sealing portion 310. This is achieved by providing support to the material constituting the body 308 of the seal 300 between the cam surface 314 of the first sealing portion 310 and the washer 322.

The area of the inside surface 328 of the body 308 of the seal 300 in contact with the outer most surface 324 of the cable 320 is therefore maximised ensuring that the grip on the cable is also maximised. This tighter grip on the cable 320 also acts to provide a better seal between the two volumes on either side of the seal 300 whereby the cable gland 301 is a means of communication between the two volumes.

Figure 6:
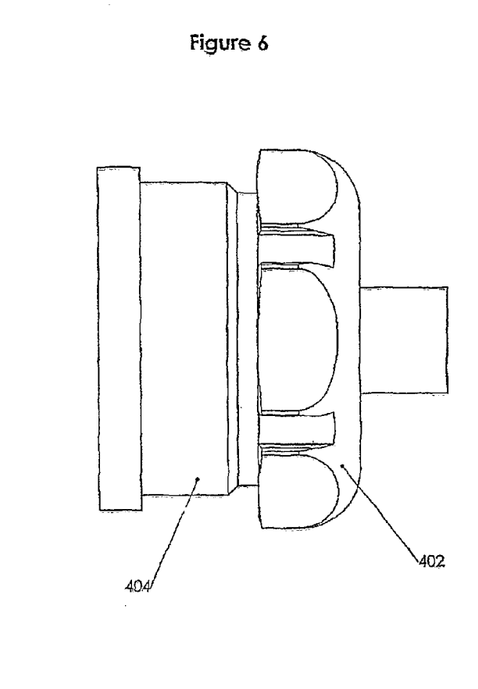
FIG. 6 is an alternative embodiment of a first and second sealing portion of a cable gland.

FIG. 6 illustrates an alternative embodiment of a first and second sealing portion 402, 404 similar to those in the above discussed embodiments of a cable gland.

Figure 7:
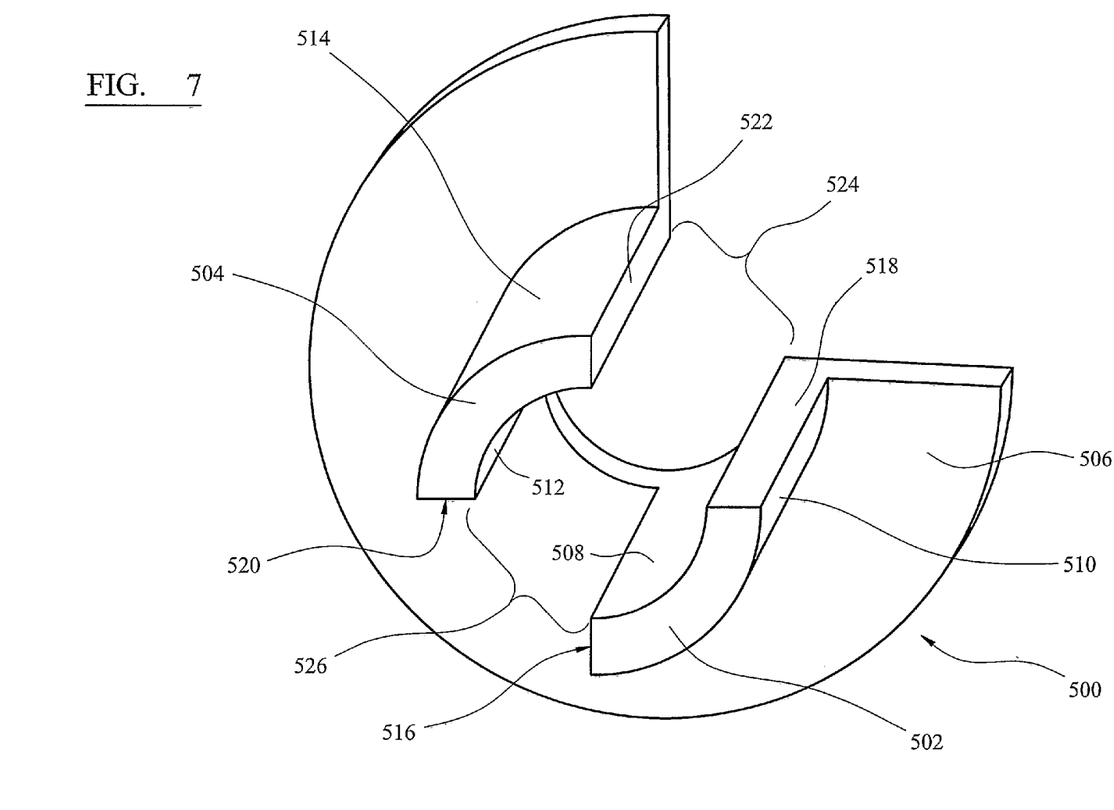
FIG. 7 is a perspective view of a first embodiment of a support portion for use in conjunction with a seal used in a cable gland.

FIG. 7 illustrates a support portion 500 for use in conjunction with a cable gland seal such as that illustrated in FIG. 1. Using support portion 500 in conjunction with a cable gland seal can enhance the effects of grip and sealing provided by the seal when used on its own. The support portion 500 in FIG. 7 has first and second partially annular solid portions 502, 504 and a partially annular flange portion 506 connected to the first and second solid portions 502, 504. Both the first and second solid portions 502, 504 have partially annular inner surfaces 508, 512 and outer surfaces 510, 514 respectively. The first solid portion 502 also has first and second edge portions 516, 518, and the second solid portion 504 has third and forth edge portions 520, 522, such that these first to forth edge portions define first and second missing portions 524, 526 of the annulus defined by the partially annular first and second solid portions 502, 504.

With reference to FIGS. 1 and 7, a support portion 500 is used in conjunction with cable gland seal 112 by placing the support portion 500 inside the seal 112 so that when the first and second sealing portions 102, 110 are brought increasingly more into engagement with one another, thereby deforming the seal 112, the inner most surface 113 of the seal 112 is bought into engagement with the outer surfaces 510, 514 of the support portion 500. This engagement results in a force being applied to the outer surfaces 510, 514 causing the support portion 500 to deform such that edge portions 518, 522 and 516, 520 are respectively brought closer together. This deformation also brings the inner surfaces 508, 512 of the support portion 500 into engagement with the outermost surface 124 of cable 122. By bringing the first and second sealing portions 102, 110 increasingly more into engagement with one another, the seal 112 will deform to such an extent that it will move into the space defined by the missing portions 524, 526 of the support portion 500 and into engagement with the outermost surface 124 of cable 122. The rubber material from which these seals 112 are formed is sufficiently malleable to completely fill this space and provide a complete seal around the cable.

The reaction force exerted by the seal 112 and support portion 500 on the cable 122 perpendicular to axis 120 act to produce a frictional force between the cable 122, seal 112 and support portion 500 and prevents any lateral movement of the cable 122 along axis 120 when a pulling force is applied to the cable 122 along axis 120. This also acts to provide a water tight seal between the seal 112, support portion 500 and the cable 122 allowing the cable gland 100 to shield electrical components in a first volume from the environment in a second volume.

Figure 8:
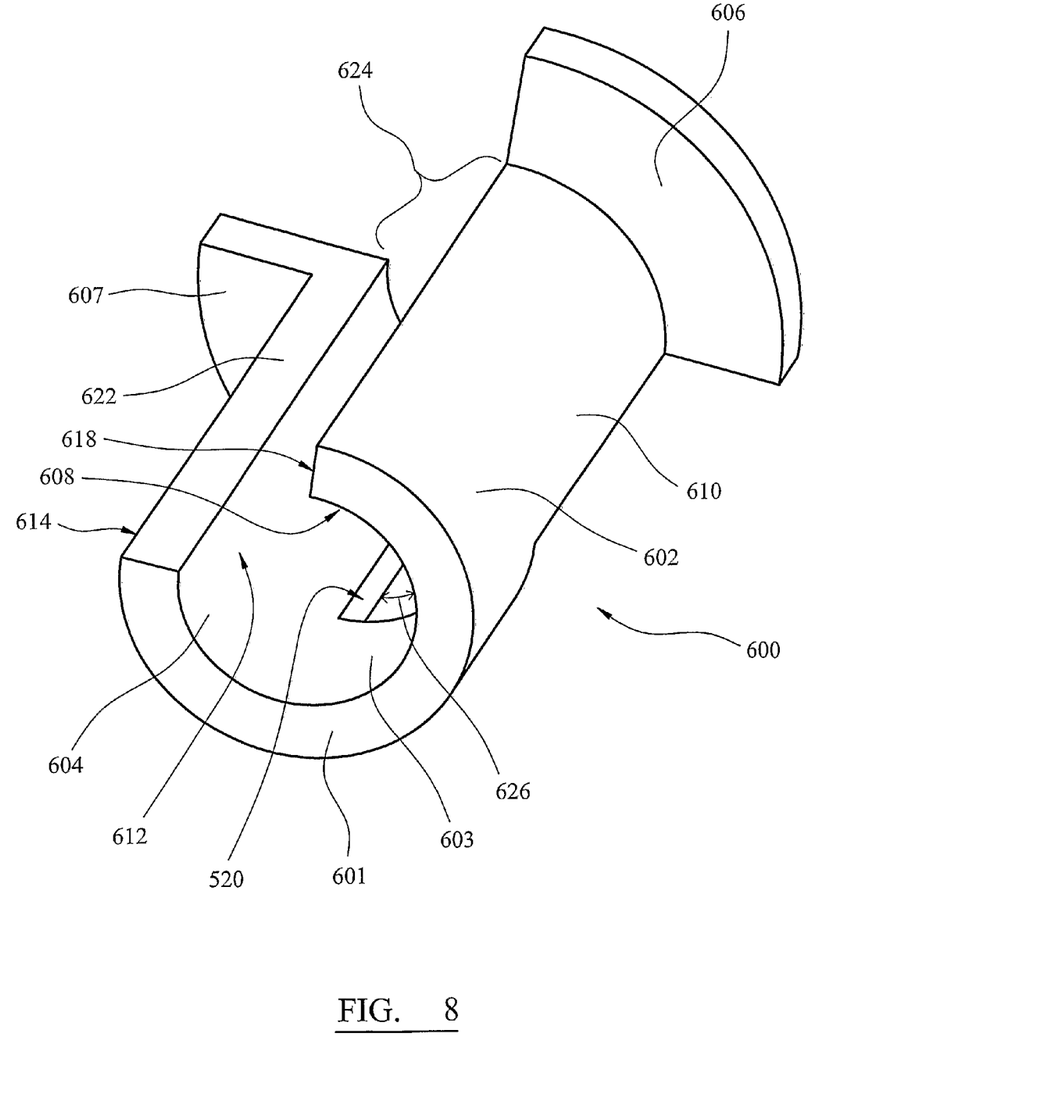
FIG. 8 is a perspective view of a second embodiment of a support portion for use in conjunction with a seal used in a cable gland.

FIG. 8 illustrates a second embodiment of the support portion, which parts in common with FIG. 7 have been given like reference numerals increased by 100. However, instead of having two solid portions connected to a single flange portion, the support portion 600 in FIG. 8 has two flange portions 606, 607 connected to a single body portion 601, consisting of first and second solid portions 602, 604 connected by connecting portion 603.

Figure 9:
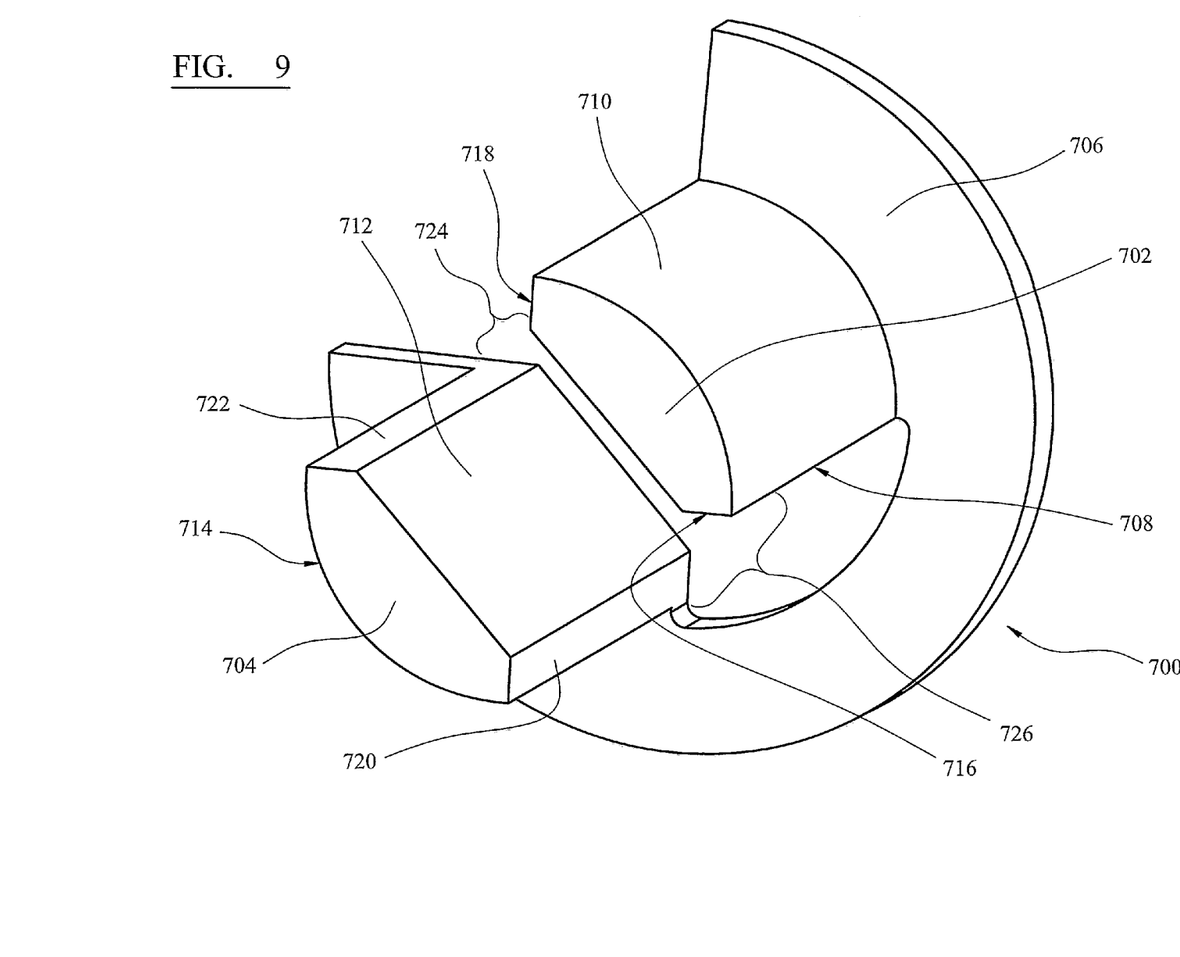
FIG. 9 is a perspective view of a third embodiment of a support portion for use in conjunction with a seal used in a cable gland.

FIG. 9 illustrates a third embodiment of the support portion illustrated in FIG. 7, wherein all similar parts are labelled with like reference numerals increased by 200. However, the support portion 700 in FIG. 9 has first and second solid portions 702, 704 which have partially annular outer surfaces 710, 714 and flat inner surfaces 708, 712.

Figure 10:
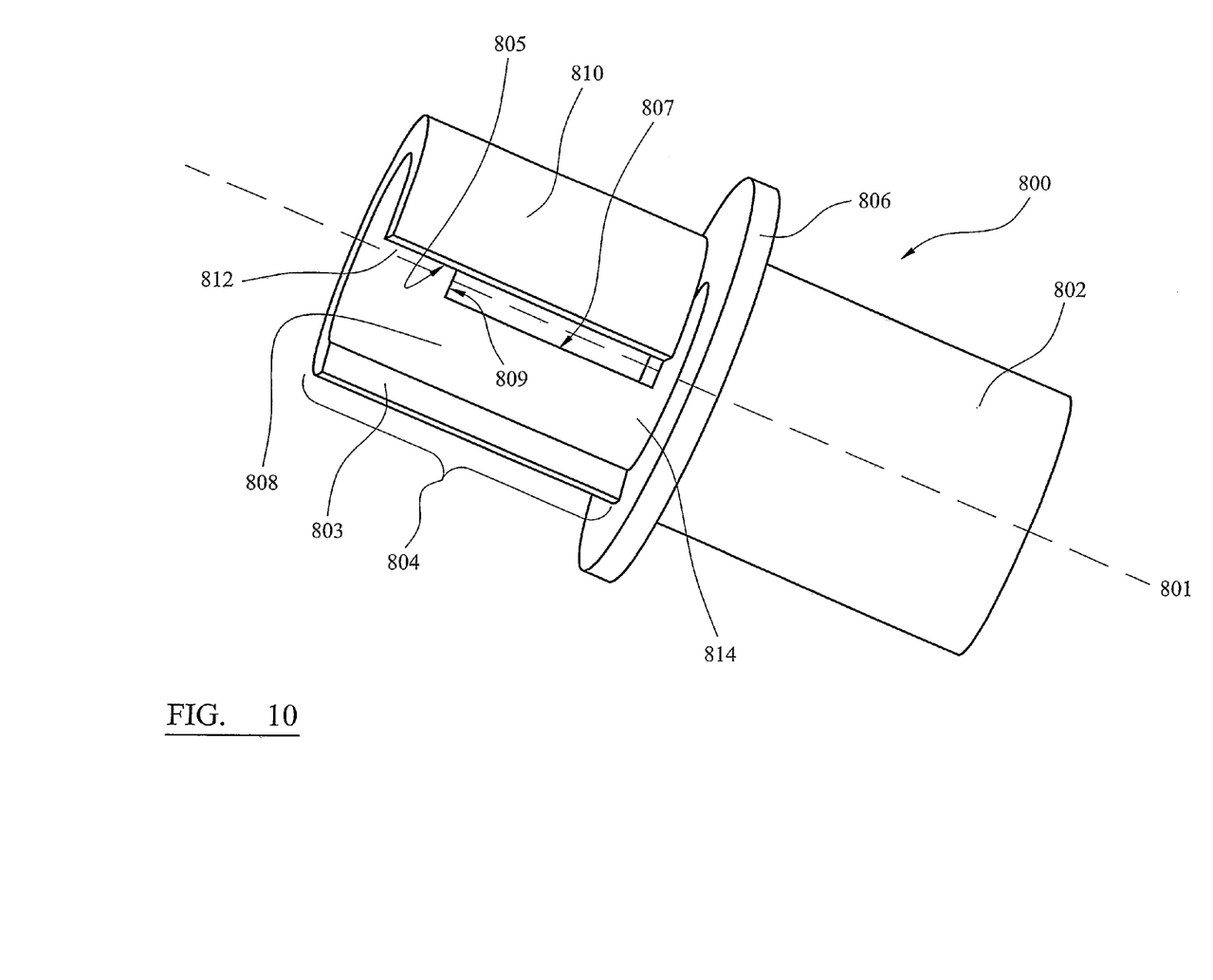
FIG. 10 is a first perspective view of a forth embodiment of a support portion for use in conjunction with a seal used in a cable gland.
Figure 11:
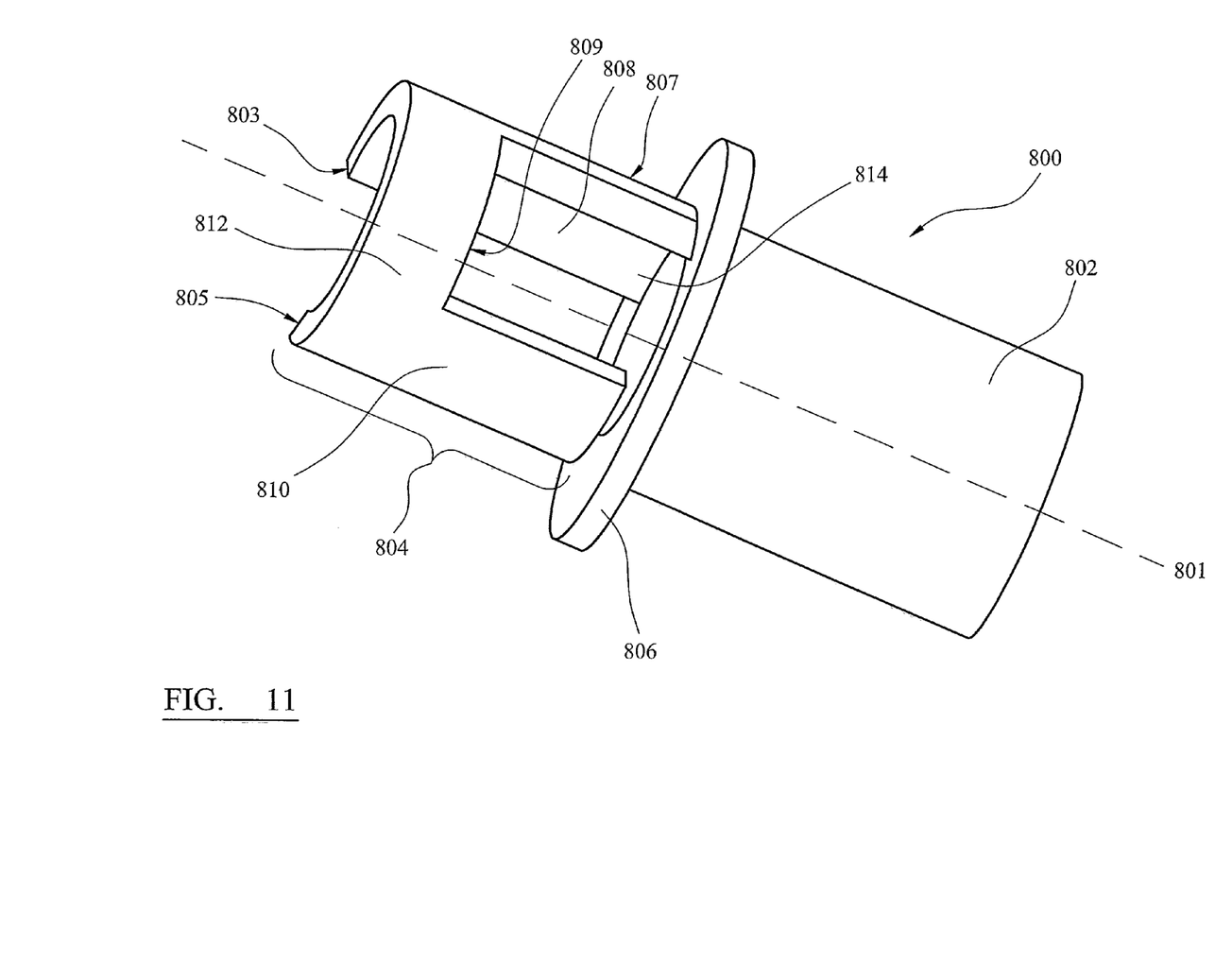
FIG. 11 is a second perspective view of the support portion in FIG. 10.

FIGS. 10 and 11 illustrate a forth embodiment of the support portion illustrated in FIG. 7. However, the support portion 800 illustrated in FIG. 10 has a tubular first body portion 802 and a substantially tubular second body portion 804, and both the first and second body portions 802, 804 are connected to a flange portion 806 and define an axis 801. The second body portion 804 is made up of first and second partially annular solid portions 808, 810 and first and second partially annular connecting portions 812, 814. The first connecting portion 812 is connected to a first end of both the first and second solid portions 808, 810. The second connecting portion 814 connects the flange portion 806 to a second end of only the first solid portion 808.

Figure 12:
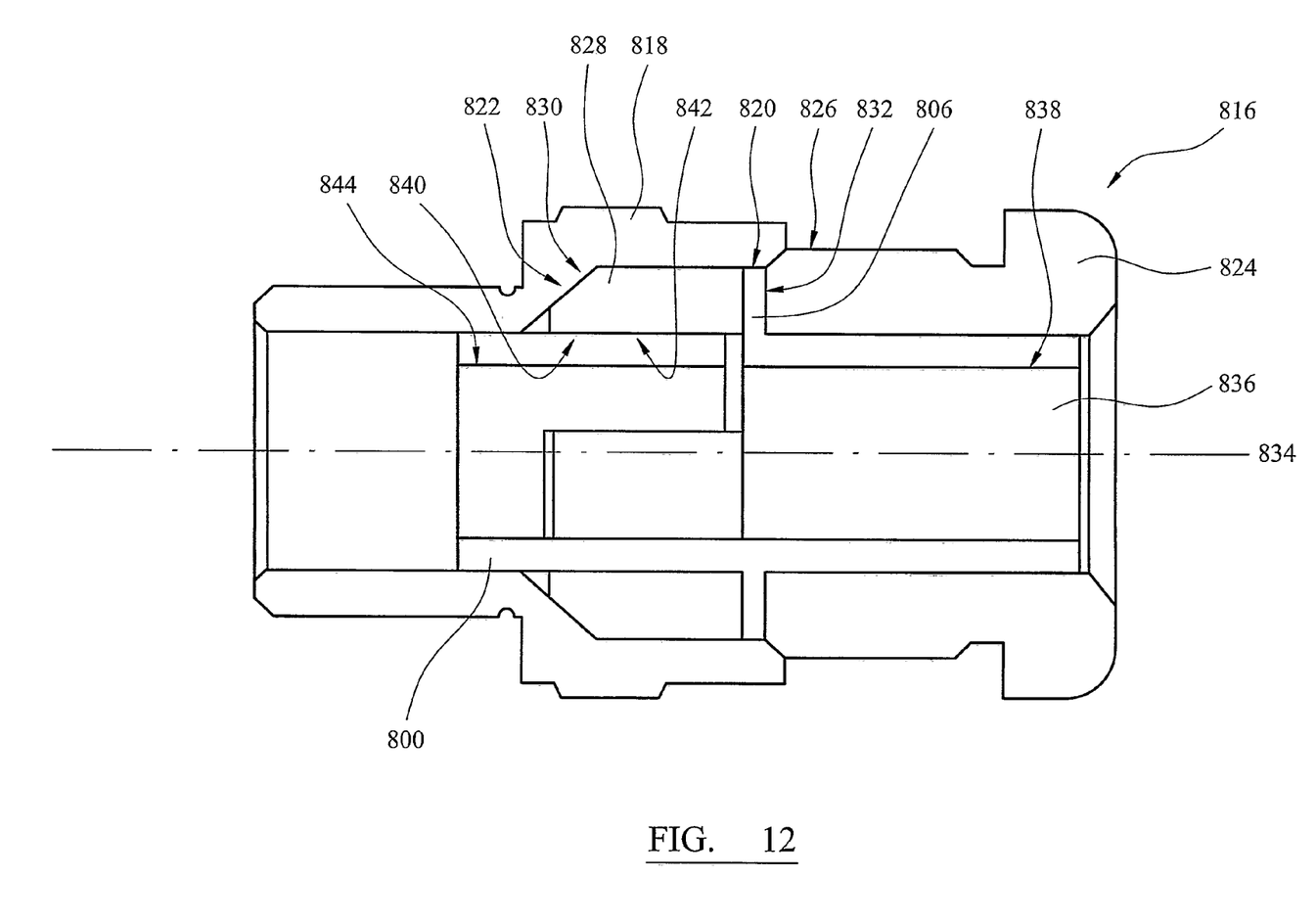
FIG. 12 is a perspective view of the support portion in FIG. 10 being used in conjunction with a seal in a cable gland.

FIG. 12 illustrates a support portion 800, as in FIGS. 10 and 11, in use in conjunction with a cable gland seal similar to that illustrated in FIG. 1. A cable gland 816 has a substantially cylindrical first sealing portion 818 having both first and second internal surface portions 820, 822. The first internal surface portion 820 is internally threaded and the second internal surface portion 822 is a cam surface. The second substantially cylindrical sealing portion 824 has an externally threaded surface 826 which is adapted to be threadably engaged with the internally threaded surface 820 of the first sealing portion 818.

The cable gland 816 in FIG. 12 further comprises a substantially ring shaped seal 828 consisting of an elastic material, which also has a cam surface 830. The seal 828 is brought into engagement with the first sealing portion 818 such that the cam surface 822 of the first sealing portion 818 engages the cam surface 830 of the seal 828. A surface 832 of the second sealing portion 824 engages the flange portion 806 of support portion 800.

The cable gland 816 has an axis 834 extending along its cross sectional centre of rotation. A cable 836 is made to extend with clearance through the first sealing portion 818, the second sealing portion 824, the seal 828 and support portion 800 along axis 834 so that the first and second sealing portions 818, 824 are threadably engaged with each other around the support portion 800 and seal 828.

A cable 836 which extends through the cable gland 816 with clearance has an outer surface 838 which is closer to axis 834 than the inner surface of the first sealing portion 818, the second sealing portion 824, the support portion 800 and the seal 828. When the extent to which the first and second sealing portions 818, 824 are threadably engaged is increased, the more the seal 828, which is between the two sealing portions, is brought into contact with the cam surface 822 and flange portion 806 which is acted on by surface 832 of the second sealing portion 824.

The reaction forces exerted on the seal 828 by both the cam surface 822 and flange portion 806 cause the seal 828 to deform in such a way that its inner most surface 840 is brought into engagement with the outer most surface 842 of the support portion 800. Such engagement exerts a force on the support portion 800 causing it to deform in such a way that its first and second edge portions 803, 805 are moved closer together, thereby causing its inner surface 844 to be brought into engagement with the cable 836 such that the support portion 800 presses down and exerts a component of force on the cable 836 along a direction perpendicular to axis 834. When the extent to which the first and second sealing portions 818, 824 are threadably engaged is further increased, seal 828 is deformed such that it moves into fill the space defined by the first, second, third, forth and fifth edge portions, 803, 805, 807, 809, 811, of support portion 800, the outer most surface 838 of cable 836, and the inner most surface 840 of the seal 828.

The reaction force exerted by the seal 828 and support portion 800 on the cable 836 perpendicular to axis 834 acts to produce a frictional force between the cable 836 and seal 828 in order to prevent any lateral movement of the cable 836 along axis 834 if a pulling force is applied to the cable 836 along axis 834. This also acts to provide a water tight seal between the seal 828, support portion 800 and cable 836 allowing the cable gland 816 to shield electrical components in a first volume from the environment in a second volume.

It will be appreciated by persons skilled in the art that the above embodiments have been described by way of example only and not in any limitative sense, and that various alterations and modifications are possible without departure from the scope of the invention as defined by the appended claims. For example, the grip rings referred to in the description may be complete or split rings. The grip rings referred to in the description may be embedded within the body of the seal and therefore may not be in engagement with the inside surface of the seal. The grip rings may alternatively be engaged with the external surface of the body of the seal. Each grip ring could also be formed from a series of short sections of ring embedded in the seal which forms a ring having a series of short gaps between separate portions. The elongate object which is made to pass through a gland as discussed in the description may in fact be any elongate object, for example a pipe, and not specifically a cable. The cross sectional shape of both the seal and elongate object referred to in the description may be any shape and not specifically circular. The support portions used in the seal according to the present invention may be metallic or even a harder/different grade of rubber than that constituting the body of the seal.

The invention claimed is:

1. A support portion for use in conjunction with a seal used in a cable gland, the support portion comprising a substantially tubular body having a solid portion and a missing portion, said solid portion having at least a partially annular external surface and an internal surface of a first cross sectional shape said internal surface adapted to engage an external surface of a cable, wherein said external and said internal surfaces are adapted to respectively receive and transfer a force and said external surface is adapted to engage an internal surface of a seal along at least a portion of an axial length of said internal surface of said seal, said solid portion further comprises first and second edge portions defining said missing portion, and said first and second edge portions are adapted to move closer together when said external surface of said solid portion receives a force, and wherein said first and second edge portions remain substantially parallel to each other as they move closer together.

2. A support portion according to claim 1, wherein said internal surface of said solid portion is at least partially curved.

3. A support portion according to claim 1, wherein said internal surface of said solid portion is at least partially flat.

4. A support portion according to claim 1, further comprising at least one flange portion at least partially in engagement with said solid portion.

* * * * *

UNITED STATES PATENT AND TRADEMARK OFFICE
CERTIFICATE OF CORRECTION

PATENT NO.        : 8,440,919 B2
APPLICATION NO. : 12/995051
DATED             : May 14, 2013
INVENTOR(S)       : Robb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 141 days.

Signed and Sealed this
Eighth Day of September, 2015

Michelle K. Lee
*Director of the United States Patent and Trademark Office*